US009063335B2

(12) United States Patent
Sommer et al.

(10) Patent No.: US 9,063,335 B2
(45) Date of Patent: Jun. 23, 2015

(54) APPARATUS AND METHOD FOR EXAMINING A SPECIMEN BY MEANS OF PROBE MICROSCOPY

(75) Inventors: Gunnar Sommer, Berlin (DE); Jörn Kamps, Berlin (DE)

(73) Assignee: JPK INSTRUMENTS AG (DE)

( * ) Notice: Subject to any disclaimer, the term of this patent is extended or adjusted under 35 U.S.C. 154(b) by 57 days.

(21) Appl. No.: 12/377,709

(22) PCT Filed: Aug. 20, 2007

(86) PCT No.: PCT/DE2007/001468
§ 371 (c)(1),
(2), (4) Date: Mar. 3, 2009

(87) PCT Pub. No.: WO2008/019679
PCT Pub. Date: Feb. 21, 2008

(65) Prior Publication Data
US 2010/0229262 A1     Sep. 9, 2010

(30) Foreign Application Priority Data

Aug. 18, 2006 (DE) .......................... 10 2006 039 149

(51) Int. Cl.
| G01Q 60/06 | (2010.01) |
| G02B 21/08 | (2006.01) |
| B82Y 35/00 | (2011.01) |
| G02B 21/00 | (2006.01) |
| G01Q 30/02 | (2010.01) |

(52) U.S. Cl.
CPC ................. *G02B 21/08* (2013.01); *B82Y 35/00* (2013.01); *G02B 21/002* (2013.01); *G01Q 30/025* (2013.01)

(58) Field of Classification Search
CPC ... G01Q 20/02; G01Q 30/025; G02B 21/002; G02B 6/4206
USPC ...................... 850/21, 22, 24, 30, 31, 32, 5, 6
See application file for complete search history.

(56) References Cited

U.S. PATENT DOCUMENTS

| 4,914,293 A | 4/1990 | Hayashi et al. |
| 5,260,824 A | 11/1993 | Okada et al. |
| 5,360,977 A | 11/1994 | Onuki et al. |
| 5,808,790 A | 9/1998 | Otaki |

(Continued)

FOREIGN PATENT DOCUMENTS

| EP | 0509856 A1 | 10/1992 |
| EP | 0527448 A2 | 2/1993 |

*Primary Examiner* — Nicole Ippolito
*Assistant Examiner* — Hanway Chang
(74) *Attorney, Agent, or Firm* — Schmeiser, Olsen & Watts, LLP

(57) ABSTRACT

The invention relates to an apparatus and a method for examining a specimen by means of probe microscopy, in particular scanning probe microscopy. The apparatus comprises a probe microscope device which has a specimen holder for holding a specimen to be examined, a measurement probe and a displacement unit which is configured to displace the specimen holder and the measurement probe relative to one another for an examination of the specimen by means of probe microscopy, and comprises a condenser illumination and also an optical system which is arranged downstream of the condenser illumination and is configured to project condenser light, which is emitted by the condenser illumination in a condenser light path, into the region of the specimen holder for optical microscopy of the specimen to be examined, while at least partially maintaining condenser light parameters with which the condenser light is emitted by the condenser illumination.

34 Claims, 4 Drawing Sheets

(56) References Cited

U.S. PATENT DOCUMENTS

Figure 1:
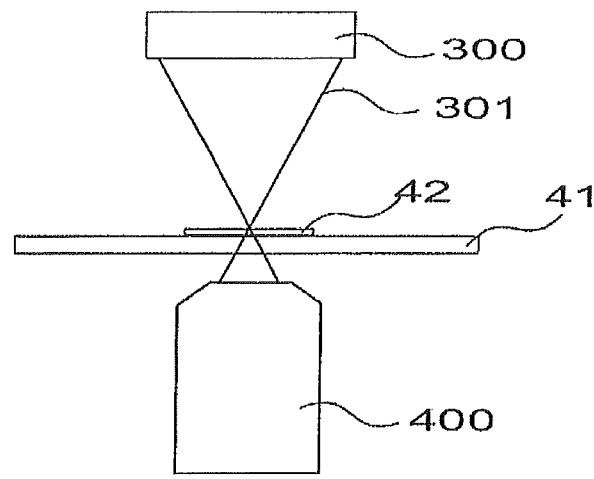

| | | | |
|---|---|---|---|
| 5,825,020 A | 10/1998 | Hansma et al. | |
| 5,952,562 A | 9/1999 | Yagi et al. | |
| 2003/0015651 A1* | 1/2003 | Kiguchi et al. | 250/234 |
| 2007/0125969 A1* | 6/2007 | Schellenberg et al. | 250/504 R |

* cited by examiner

APPARATUS AND METHOD FOR EXAMINING A SPECIMEN BY MEANS OF PROBE MICROSCOPY

The invention relates to an apparatus and a method for examining a specimen by means of probe microscopy, in particular scanning probe microscopy.

BACKGROUND OF THE INVENTION

Using measurement or analysis technologies based on probe microscopy, a specimen to be examined is examined experimentally by detecting an influencing of a measurable property of a measurement probe by the specimen to be examined. During the examination of the specimen by means of scanning probe microscopy (SPM), a scanning of the specimen takes place by means of a relative movement between the measurement probe and the specimen. By way of example, a surface for analysis on the specimen is scanned.

One method of scanning probe microscopy is atomic force microscopy (AFM). This serves for measuring surface properties of the specimen, for example the topography, with a high lateral and vertical resolution. The term "lateral resolution" here denotes the resolution in a plane of the surface to be examined. The direction perpendicular to this plane is referred to as the vertical direction. In the vertical direction, the topography of the surface is determined with a vertical resolution. However, volume properties close to the surface can also be determined, for example the elasticity of a specimen. The resolution of the vertical and/or horizontal displacement of the measurement probe relative to the specimen during probe microscopy usually lies in the range of a few nanometers and above, whereas customary methods used for the optical examination of a specimen operate with a resolution of several hundred nanometers.

In order to be able to carry out scanning probe microscopy, the distance between a measurement probe and the specimen to be examined must be able to be set and measured in a very precise manner. As the measurement probe, measurement beams (also known as cantilevers) are used for example in connection with scanning probe microscopes. Particularly in atomic force microscopes, the measurement parameter evaluated is a force occurring as a result of an interaction between the cantilever and the specimen to be examined, it being possible in the simplest case for the force to be described by a Lenard-Jones potential. Several options may be used for detecting the force. In the simplest case, a deflection of the measurement probe is detected, said measurement probe in the case of the cantilever in atomic force microscopy usually being designed as a thin spring beam. However, measurement methods also exist in which the cantilever is made to vibrate. The attenuation of the amplitude of the induced vibration is then the measurement parameter used for the adjustment. One common feature of the known measurement methods is that an interaction between the measurement probe and the specimen to be examined is measured. The term "scanning probe microscopy" in the meaning used here encompasses, in addition to the aforementioned techniques, all techniques in which one or more elements acting as measurement probes scan an object structure.

In one known measurement method, the force acting on the cantilever is detected using a light pointer principle. In this case, a measurement light beam, in particular a laser beam, is directed onto the cantilever, the intention being for focussing to be provided. However, when using the light pointer principle, the problem occurs that the laser spot focussed onto the cantilever should be smaller than the width of the cantilever, in order to allow optimal detection of the bending of the cantilever. Therefore, it must be possible to produce such a small spot using suitable optics. Depending on a bending of the cantilever, the measurement light beam is reflected at the cantilever or at a component connected to the cantilever, at a certain angle relative to the direction of impingement. The reflected light beam is then directed onto a photodiode, which has a receiver surface comprising at least two segments. A difference of the received light beam for the two segments indicates that the measurement light beam is removed from a central position between the two segments. The central position is defined in such a way that the measurement light beam impinges equally on the two segments. A bending of the cantilever leads to the situation that the equal distribution of the reflected measurement light beam across the two segments is changed.

If a torsion of the measurement probe, preferably designed as a cantilever, is also to be detected in addition, use may be made of a photodiode comprising four segments. The use of a different position-sensitive detector may also be provided. As a result, a position determination of the measurement light beam in two dimensions is then possible. Knowing a spring constant of the cantilever, the measurement of the bending of the cantilever can then be used to determine the force between the cantilever and the specimen to be measured.

When scanning the specimen to be measured, usually the distance between the specimen and the cantilever in the vertical direction is set in an exact manner by means of a relative movement of the specimen and cantilever. It is thus possible, for example, to set a constant force ratio. In order to set the distance, use may be made for example of piezoelectric components. At the same time, during the measurement, a scanning-type relative movement of the cantilever laterally to the specimen is carried out.

In principle, either the specimen or the cantilever can be moved by means of displacement or adjustment elements. A splitting of the movement is also possible, for example a lateral movement of the specimen and a vertical movement by the cantilever.

The efficiency of a cantilever-based scanning probe microscope is not least also determined by the cantilever used. On the one hand, the force exerted on the specimen is determined as a function of the deflection via the force constant of the bending beam. For biological specimens, a low force constant is essential so as not to damage the specimen as a result of excessive forces during the measurement. On the other hand, the frequency of the intrinsic resonance and also the quality determine the time in which the cantilever can react to external force changes. The higher the resonant frequency of the cantilever, the quicker the reaction of the bending beam and the quicker scanning can be carried out. Furthermore, the thermally induced noise of the cantilever in a fixed bandwidth is then also reduced. The use of short, narrow and thin bending beams, which are also referred to as "small cantilevers", is therefore advantageous since in this case a high resonant frequency can be combined with an acceptably low force constant.

Nearfield microscopy (SNOM—"Scanning Nearfield Optical Microscopy"), a sub-type of scanning probe microscopy, is capable of measuring additional optical parameters. In this case, the achievable optical resolution is approximately one to two orders of magnitude better than that of farfield optical measurements, which can be carried out for example using a light microscope. This resolution is achieved by illuminating the specimen for example through an aperture, the diameter of which is less than half the wavelength of the emitted light, or else by collecting through this aperture any light scattered by the specimen. The aperture diameter is in this case the parameter which determines the resolution. As an alternative to a small aperture, a suitable scattering object with a small expanse can also act as the nearfield source, for example the tip of a cantilever of an atomic force microscope. The optical parameters are only measured on the surface in the vicinity of the measurement probe, since the nearfield, due to its nature, has already decayed exponentially to very low intensities after a few tens of nanometers. During the nearfield optical measurement, therefore, the distance between the aperture/scattering object and the specimen must be kept constant in the nm range. A combination of SNOM and force/attenuation-measuring methods such as atomic force microscopy has proven useful for this.

The illumination of the small aperture is usually carried out by a second laser, and therefore the SPM structure should allow the illumination of a nearfield aperture in the cantilever tip by a second laser.

It is often useful to examine the specimen to be examined by means of an optical microscope in addition to the analysis by probe microscopy. This allows an overview of the specimen in a larger field of vision than in the case of scanning probe microscopy. Moreover, such optical microscope examinations are quick and are established as standard methods. In this case, in order to obtain optimized results in the transmitted light or reflected light mode, the specimen must be illuminated by a condenser illumination so as to have sufficient illumination of the specimen for examination by means of a light microscope.

During the optical microscopy, use may be made of various optical contrast methods, such as for example phase contrast or differential interference contrast (DIC), which offer a high resolution and require for optimal evaluation capability a sufficient condenser illumination in the specimen plane, for example with regard to the intensity distribution, polarization distribution, angle of incidence distribution or position of the exit pupil and exit window.

One very simple and generally recognized implementation of a nearfield arrangement is for example to use as the nearfield source a bent optical fibre which is tapered at the end and vapour-coated with a metal layer apart from a small aperture, and simply to introduce it directly over the specimen into the path of the condenser light, which is also referred to as the condenser light path. The specimen thus remains fully accessible to the condenser light apart from a minimal restriction and can be imaged by means of the nearfield microscope without any appreciable restriction of the optical examination method. However, due to the special distance detection ("shear force mode") used therein, the fibreglass probes cannot be used or can be used only unsatisfactorily for measurements in liquids.

A second possibility for combined examination by means of probe microscopy and optical microscopy is to integrate the scanning probe microscope in an arrangement with an upright optical microscope, which is also referred to as a light microscope. In this case, instead of a normal microscope objective, use is made of special objective which carries the cantilever and can optionally also be displaced in the μm range in up to three dimensions. However, this implementation has the considerable disadvantage that the lack of stability of the upright microscope in the nm range does not allow a high-resolution measurement using the "objective" for atomic force microscopy, due to a tendency of the microscope to vibrate.

One possibility for transmitting the condenser light emitted by the condenser illumination consists in arranging a free central light path, which optionally leads only through planar optical components such as glass plates, beam splitter cubes or the like and thus influences the propagation of the condenser light only to a minimal degree. However, in this case, only the space defined by the working distance of the condenser illumination between the outlet of the condenser illumination and the objective of the optical microscope can be used as installation space for the probe microscope, so that usually only condenser illuminations with a relatively small numerical aperture for the illumination and a large working distance are used.

SUMMARY OF THE INVENTION

The object of the invention is to specify an apparatus and a method for examining a specimen by means of probe microscopy, in particular scanning probe microscopy, by means of which the possibility of simultaneously examining the specimen by means of different microscopic techniques using a combined system of measurement devices is improved.

This object is achieved according to the invention by an apparatus for examining a specimen by means of probe microscopy according to independent claim 1, and a method for examining a specimen by means of probe microscopy according to independent claim 20. Advantageous embodiments of the inventions form the subject matter of dependent subclaims.

The invention encompasses the concept of providing, in an apparatus for examining a specimen by means of probe microscopy, in particular scanning probe microscopy, a probe microscope device which has a specimen holder for holding a specimen to be examined, a measurement probe and a displacement unit which is configured to displace the specimen holder and the measurement probe relative to one another for an examination of the specimen by means of probe microscopy using the measurement probe. In addition, the apparatus comprises a condenser illumination and also an optical system which is arranged downstream of the condenser illumination and is configured to project condenser light, which is emitted by the condenser illumination in a condenser light path, into the region of the specimen holder for optical microscopy of the specimen to be examined, while at least partially maintaining condenser light parameters with which the condenser light is emitted by the condenser illumination.

It is thus possible for condenser light emitted by the condenser illumination to be guided, in a manner desired for the respective application, from the outlet of the condenser illumination into the region of the specimen holder, in order there to illuminate accordingly the specimen of the measurement object arranged on the specimen holder for microscopic examination. The condenser illumination provides an illumination of the specimen for optical microscopy. It is therefore a microscope illumination designed in a certain manner for optical microscopy, which provides a so-called Köhler illumination. The latter comprises, in addition to a light source, usually one or more optical elements, in particular a condenser lens on the side facing towards the specimen. The Köhler illumination principle is known per se and therefore will not be further explained. The condenser illumination which provides a Köhler illumination may form an independent structural unit which can be separated from the rest of the apparatus for examining the specimen by means of probe microscopy. Such structural units are also commercially available. However, a partial or full integration of the condenser illumination into the apparatus may also be provided.

After leaving the condenser illumination, the light produced by the latter, namely the condenser light, passes along a condenser light path to the specimen on the specimen holder. Without the provided optical system for projecting the condenser light emitted by the condenser illumination into the region of the specimen holder, which thus forms an optical projection system, the propagation of the condenser light along the condenser light path from the outlet of the condenser illumination to the specimen holder is dependent on the configuration of the condenser illumination. By means of the optical system, an intervention now takes place in the region of the condenser light path so as to project the condenser light, optionally in modified form, into the specimen holder region. During this, preferably the greatest possible number of properties of the condenser light as emitted by the condenser illumination are maintained. By means of the optical system, it is possible to set in a targeted manner the condenser light parameters which are to be changed and those which are to be maintained.

One preferred further development of the invention provides that the optical system is designed to extend the condenser light path. In this embodiment, the condenser light path, as would be obtained without use of the optical system, i.e. depending on the configuration of the condenser illumination, is extended. In this way, the distance between the outlet of the condenser illumination and the region of the specimen holder can be increased, which avoids any restrictions in particular with regard to an installation height of the measurement apparatus. As an alternative, the originally obtained condenser light path may also be shortened.

In one purposeful configuration of the invention, it may be provided that the condenser light path is formed through a holding component which is transparent to light and which holds the measurement probe. In addition or as an alternative, the condenser light path may also extend through further components of the probe microscope device, which are at least partially made from a material which is transparent to light and are designed as holding components, optical elements or carrier components.

One advantageous embodiment of the invention provides that the condenser light path is formed at least partially through the probe microscope device. In one configuration, the condenser light path may essentially also be formed completely through the probe microscope device. This means that the outlet of the condenser illumination is arranged directly adjacent to or even inside the probe microscope device, and the condenser light is then guided essentially within the probe microscope device.

Preferably, one further development of the invention provides that the optical system is designed to maintain at least one condenser light parameter selected from the following group of condenser light parameters: intensity distribution, polarization distribution, angle of incidence distribution, position of an exit pupil and position of an exit window. In one particularly preferred configuration of the invention, it is provided that the aforementioned condenser light parameters are all essentially maintained.

In one advantageous configuration of the invention, it may be provided that the optical system is designed as a multiple lens system with a plurality of optical lenses. In one simple embodiment, the multiple lens system may be formed as a double lens system. Regardless of the number of optical lenses, it is provided in one preferred further development that at least some of the optical lenses have a focal length of at most 20 mm.

One further development of the invention may provide that the plurality of optical lenses have the same focal length. Alternatively, at least two of the optical lenses may have a different focal length.

One preferred further development of the invention provides that the optical system is formed in such a way as to provide a projection scale of 1:1.

In one purposeful configuration of the invention, it may be provided that a measurement light beam path for measurement light beams is formed through the optical system. The measurement light beams serve for detecting measured values during the examination by means of probe microscopy (light pointer principle). These may be measurement light beams which are en route to the measurement probe, and/or measurement light beams which are being conducted away from the measurement probe, for example to a detector unit. The measurement light beams are produced for example by a laser device, in particular a laser diode. The measurement light beam path may run partially or essentially completely through the optical system. In this case, the measurement light beam path may extend through the optical system, passing through all or just some of the elements thereof.

One advantageous embodiment of the invention provides that the condenser illumination is formed so as to emit the condenser light in the shape of a light cone. A profile of the condenser light in the shape of a light cone is produced in particular by means of the condenser lens of the condenser illumination, which is preferably mounted immediately upstream of the outlet of the condenser illumination.

Preferably, one further development of the invention provides an optical observation channel which is configured for optical microscopy of the specimen. The design of the optical observation channel makes it possible to observe the specimen through said channel by means of optical microscopy on the specimen holder in the same position as is the case for the examination by means of probe microscopy.

In one advantageous configuration of the invention, it may be provided that the optical system is formed at least partially in the optical observation channel.

One further development of the invention may provide that the optical observation channel is configured for examining the specimen by optical microscopy in a transmitted light configuration.

One preferred further development of the invention provides that the optical observation channel is configured for examining the specimen by optical microscopy in a reflected light configuration.

In one purposeful configuration of the invention, an optical microscope device which is optically coupled to the optical observation channel may be provided. The microscope device is for example a light microscope for observing the specimen to be examined on the specimen holder.

One advantageous embodiment of the invention provides that the probe microscope device is configured to detect measurement-induced movements of the measurement probe during the examination of the specimen by means of probe microscopy using the measurement principle of a light pointer. The light pointer principle means that measurement light beams are guided from an associated light source, for example a laser device, to the measurement probe. There, the measurement light beams are at least partially reflected depending on the position of the measurement probe, and are conducted towards a detector. By means of this light pointer principle, it is possible to detect vibrations, bending or displacements of the measurement probe during the examination of the specimen by means of probe microscopy. Usually, a suitable reflection surface is located on the measurement probe for this purpose.

Preferably, one further development of the invention provides that the probe microscope device is designed as a microscope device selected from the following group of microscope devices: scanning probe microscope, nearfield microscope and atomic force microscope.

One purposeful further development of the invention provides that a numerical aperture of an opening angle of the optical system towards the specimen holder is greater than approximately 0.20, preferably greater than approximately 0.25 and more preferably greater than approximately 0.30.

One preferred further development of the invention provides that an aperture illumination path for an additional illumination is formed through the optical system. In this case, the aperture illumination path may extend through the optical system, passing through all or just some of the elements thereof.

The remarks and explanations given above in connection with advantageous configurations of the apparatus for examining a specimen by means of probe microscopy also apply accordingly to the associated configurations of the method for examining a specimen by means of probe microscopy.

DESCRIPTION OF PREFERRED EXAMPLES OF EMBODIMENTS OF THE INVENTION

Figure 2:
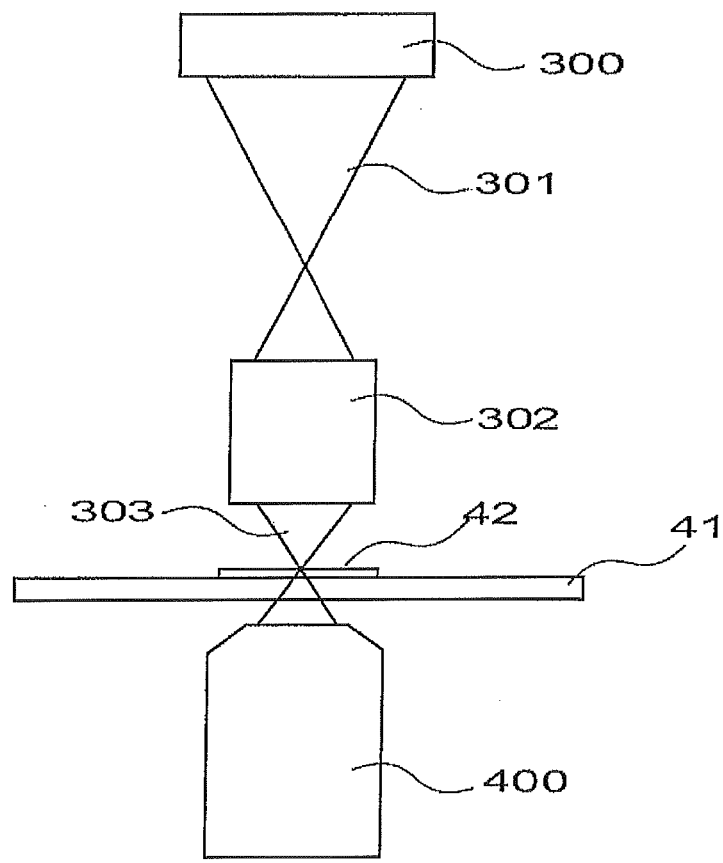
Figure 3:
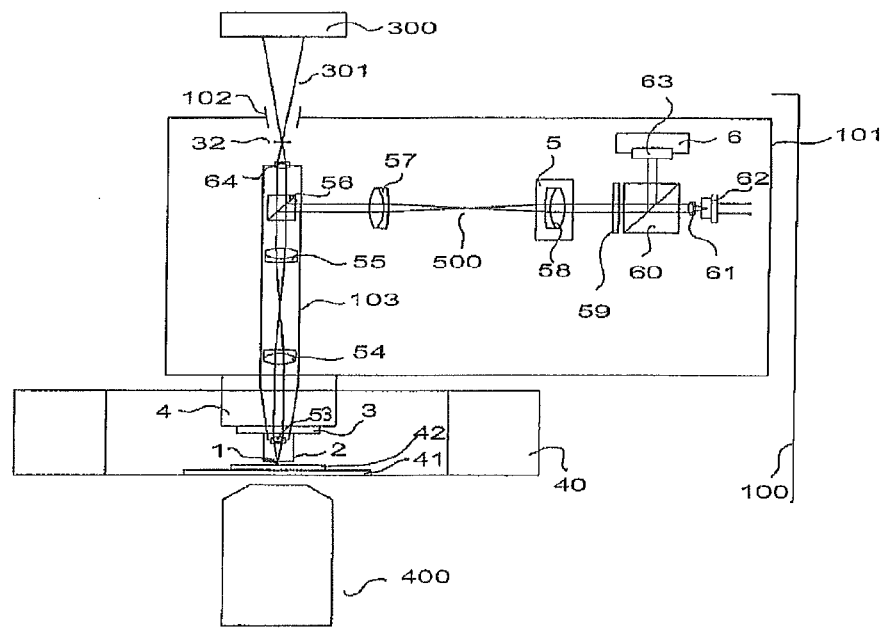
Figure 4:
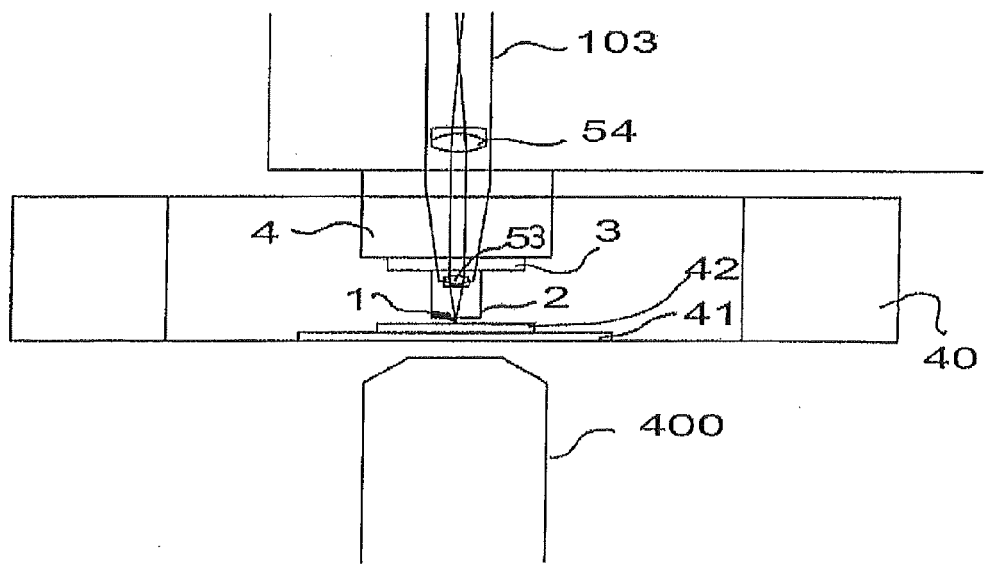
Figure 5:
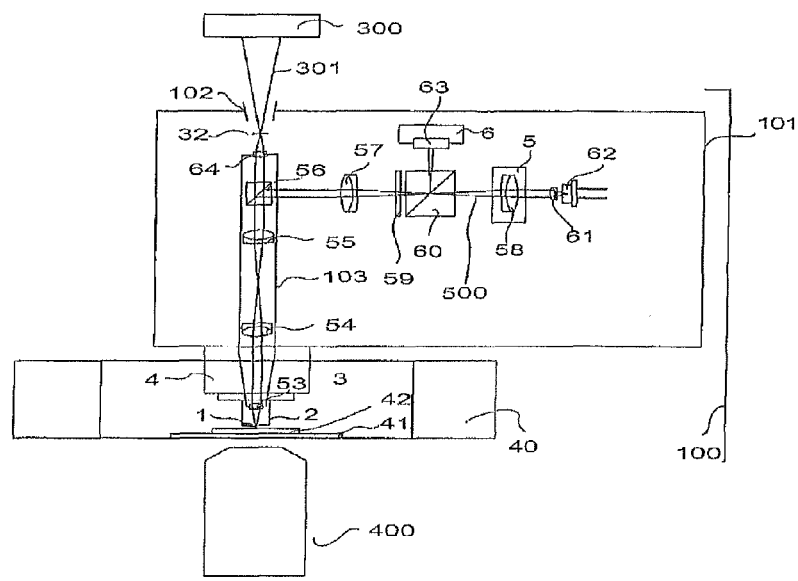
Figure 6:
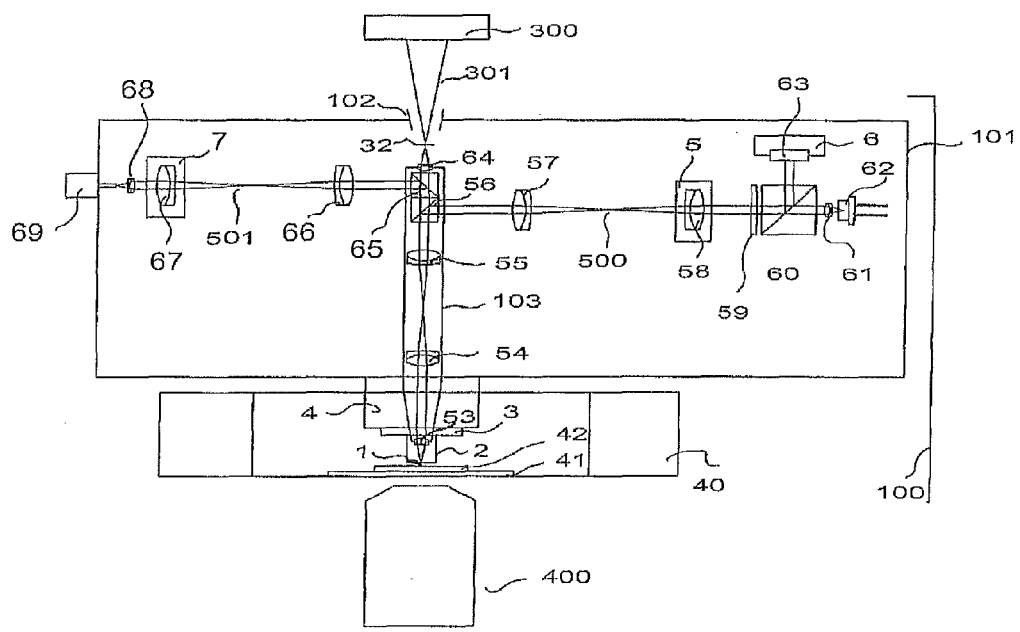
Figure 7:
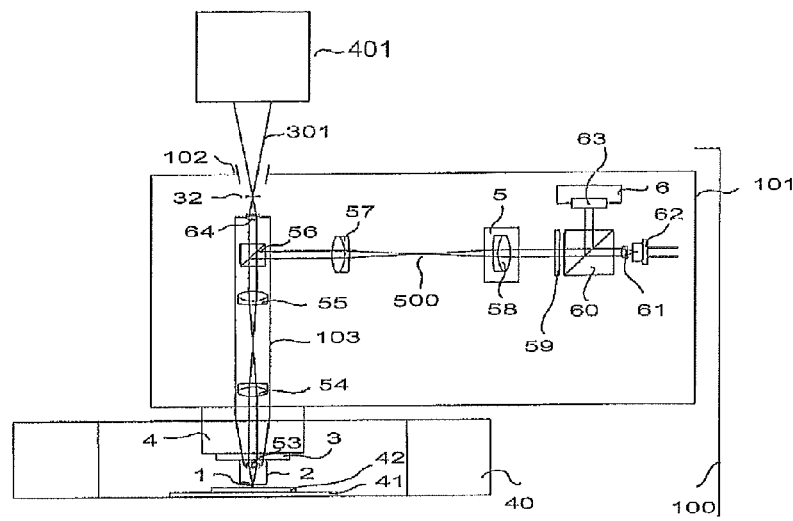
Figures 8, 9, 10:
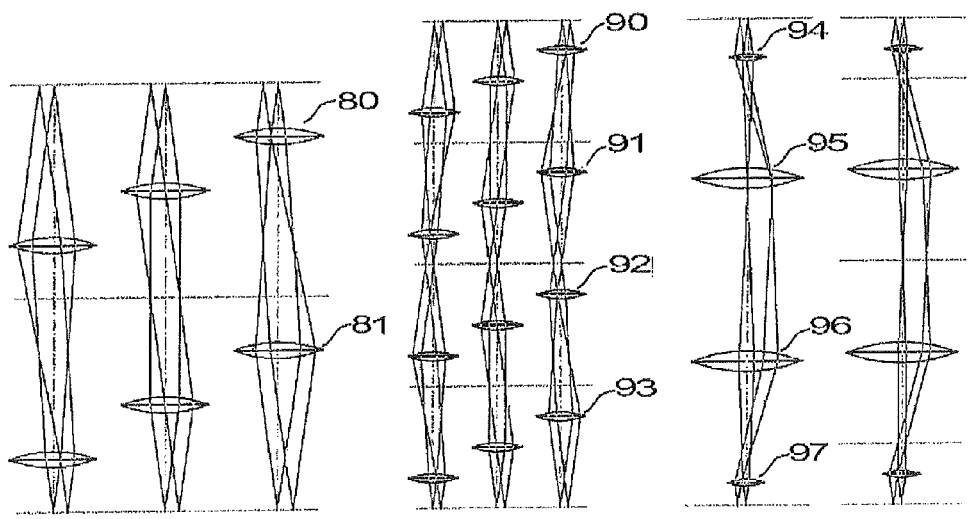

The invention will be explained in more detail below on the basis of examples of embodiments and with reference to the figures of a drawing, in which:

FIG. 1 shows a schematic view of an illumination of a specimen with condenser light for optical microscopy in a transmitted light configuration, FIG. 2 shows a schematic view of an illumination of a specimen with condenser light for optical microscopy in a transmitted light configuration, wherein provided downstream of a condenser illumination is an optical system for projecting onto the specimen the condenser light emitted by the condenser illumination, FIG. 3 shows a schematic view of an apparatus for examining a specimen by means of probe microscopy, in which there is additionally provided a light microscope in a transmitted light configuration, FIG. 4 shows an enlarged view of the region of a specimen holder in the case of the apparatus in FIG. 3, FIG. 5 shows a schematic view of an apparatus for examining a specimen by means of probe microscopy, in which there is additionally provided a light microscope in a transmitted light configuration, an offset detection unit being formed compared to FIG. 3, FIG. 6 shows a schematic view of an apparatus for examining a specimen by means of probe microscopy, in which there is additionally provided a light microscope in a transmitted light configuration, an additional illumination beam path being formed, FIG. 7 shows a schematic view of an apparatus for examining a specimen by means of probe microscopy, in which there is additionally provided a light microscope in a reflected light configuration, FIG. 8 shows a schematic view of an optical system with two lenses, beam paths being shown for three vertical positions of the two lenses, FIG. 9 shows a schematic view of an optical system with four lenses which all have the same focal length, beam paths being shown for three vertical positions of the four lenses, and FIG. 10 shows a schematic view of an optical system with four lenses which have different focal lengths, beam paths being shown for two vertical positions of the four lenses.

FIG. 1 shows a schematic view of an illumination of a specimen 42 with condenser light for optical microscopy in a transmitted light configuration. The specimen 42 arranged on a specimen holder 41 is illuminated with condenser light which, after leaving a condenser illumination 300, runs along a condenser light path 301. The condenser light serves for illuminating the specimen 42, so that the latter can be examined by light microscopy using a light microscope 400. The illustrated arrangement corresponds to a known transmitted light configuration. The distance between the outlet of the condenser illumination 300 and the specimen 42 on the specimen holder 41 is typically selected in such a way that an exit window of the condenser illumination 300 comes to lie in the plane of the specimen 42. The exit window is therefore projected into the plane of the specimen 42. The distance thus found corresponds to a working distance of the condenser illumination 300.

FIG. 2 shows a schematic view of an arrangement for illuminating the specimen 42 with condenser light, which is emitted by the condenser illumination 300 in the condenser light path 301, an optical system 302 now being introduced into the condenser light path 301 and thus influencing the course thereof. By means of the optical system 302, the condenser light emitted by the condenser illumination 300 is projected onto the specimen 42 in the region of the specimen holder 41.

The condenser light influenced by the optical system 302 reaches the specimen 42 in the form of a modified condenser light 303, which can also be referred to as the modified condenser light beam. By means of the optical system 302, a transformation of the condenser light emitted by the condenser illumination 300 into a modified condenser light beam takes place, so that an optimal illumination of the specimen 42 for optical microscopy using the light microscope 400 is ensured. Compared to the known arrangement in FIG. 1, the condenser light path 301 is extended by means of the optical system 302, while maintaining the parameters of the condenser light which are necessary for illuminating the specimen 42 with condenser light. This avoids losses, in particular with regard to an image brightness, a resolution and a contrast of the optical image during light microscopy, which may occur if the distance between the outlet of the condenser illumination 300 and the specimen 42 is increased without using the optical system 302. In particular, here too, the transformed exit window again comes to lie in the plane of the specimen 42.

FIG. 3 shows a schematic view of an apparatus for examining the specimen 42 on the specimen holder 41 by means of probe microscopy using a probe microscope device 100 which is designed for example as a scanning probe microscope. By means of a displacement unit 40, the specimen 42 and the specimen holder 41 can be displaced in a spatially precise manner in three dimensions, in order to carry out the examination of the specimen 42 by means of probe microscopy. The displacement unit 40 is formed for example by means of piezoelectric adjustment elements. However, any type of displacement unit can be used which makes it possible to set, three-dimensionally, an exact positioning of a measurement probe 1, held by a measurement probe holder 2, and the specimen 42 relative to one another.

The measurement probe holder 2 is fixed via an annular component 3 which can be moved relative to a head part 101 by means of a two-dimensional lateral displacement device 4. The displacement device 4 makes it possible to laterally displace the measurement probe holder 2, together with the measurement probe fixed thereon, relative to a lens 53 and thus to bring the measurement probe 1, which is preferably designed as a cantilever, into the region of the focus of measurement light beams 500. The suitability of the probe microscope device 100 for measurements of the specimen 42 in a liquid requires a defined transition between air and the liquid, which is water for example. This is achieved by means of the measurement probe holder 2, which is then designed as a glass pot or glass prism. The surfaces of the measurement probe holder 2 located in the beam path are configured in such a way that the condenser light path 301 is not impeded.

The measurement probe holder 2 preferably has a groove or a surface which allows an installation of the measurement probe 1 in an inclined manner relative to the plane of the specimen holder 41 and thus relative to the specimen 42 arranged thereon.

Above the probe microscope device 100, there is arranged above the head part 101 the condenser illumination 300 which emits into the condenser light path 301 condenser light propagating as a cone. The condenser light path 301, which extends as far as the specimen 42, runs essentially centrally through the head part 101, which for this purpose has an opening 102.

In the apparatus in FIG. 3, the optical system 302 shown schematically in the condenser light path 301 in FIG. 2 above is formed by a central optical tube 103 which comprises a lens system with optical lenses 53, 54, 55, 64 and also a beam splitter cube 56. The condenser light runs through the central optical tube 103 and then further through the annular component 3 and also the measurement probe holder 2 designed as a glass component, in order to finally illuminate the specimen 42 arranged on the specimen holder 41. The specimen holder 41 is for example a commercially available slide or a Petri dish.

The apparatus shown in FIG. 3 with the probe microscope device 100 which is preferably configured for scanning probe microscopy thus allows an illumination of the specimen 42 with condenser light even when the specimen 42 is arranged on the specimen holder 41 for examination by means of probe microscopy. The condenser light can propagate along the condenser light path 301 as far as an object plane 32 of the central optical tube 103 and is projected from there by means of the optical elements of the central optical tube on a projection scale of 1:1 into the region of the specimen holder 41 in the image plane located there. The image plane and the plane of the specimen 42 coincide during the measurement.

Using the apparatus shown in FIG. 3, the specimen 42 can be examined by means of probe microscopy. For this purpose, a light source 62 preferably designed as a laser produces measurement light beams 500 which are bundled by a collimation lens 61 to form a collimated beam. The collimated beam runs through a linear polarizer 60 and a λ/4 plate 59 and is then focussed by means of a lens 58 which can be moved in all three spatial directions. Here, the focussed and now circularly polarized measurement light beam has its smallest constriction at the optical focus point of the lens 58. The smallest constriction is therefore displaced as it were when the lens 58 is displaced. In order to be able to move the lens 58 in the three spatial directions, said lens is fixed to a displacement device 5 which makes it possible to move the lens 58 in the three spatial directions relative to the head part 101.

The measurement light beam thus focussed is then again collimated through a lens 57 and coupled via the beam splitter cube 56 into the central optical tube 103. There, after passing through the lenses 55, 54, 53, the measurement light beam reaches the rear side of the measurement probe 1. It is focussed here. The numerical aperture of the lens 53 is large enough to produce a small focus spot on the rear side of the measurement probe 1.

If the light source 62 already itself has a linear polarization, then it can be installed in such a way that an optimal transmission through the linear polarizer 60 in the direction of the lens 58 is ensured.

The beam splitter cube 56 for the inward and outward coupling of the measurement light beams 500 may be designed either as a beam splitter with a fixed splitting ratio over the entire spectral range of interest, or else in a wavelength-selective manner. Here, preference is given to a wavelength-selective reflection, since this means that less of the condenser light impinging from above is undesirably reflected outwards.

According to the light pointer principle, the measurement light beams 500 in the form of the laser light impinging on the measurement probe 1 are reflected and collected again by the lens 53. They are then conducted through the central optical tube 103 and coupled out by means of the beam splitter cube 56. After again passing through the λ/4 plate 59, the polarization plane of the reflected measurement light beams has rotated through 90°. Consequently, the reflected measurement light beams are now reflected in the direction of a photodiode 63 by the linear polarizer 60 designed as a beam splitter cube.

The photodiode 63 purposefully has a receiver surface with two segments. The distribution of the reflected measurement light beams between the two segments of the receiver surface of the photodiode 63 changes as a function of a bending of the measurement probe 1. The signals produced in the region of the two segments are an indication of the bending of the measurement probe 1, the bending of the measurement probe 1 in turn being the result of an interaction of the measurement probe 1 with the specimen 41. This is the customary measurement principle used in scanning probe microscopes, in particular atomic force microscopes, and therefore will not be described further here. The photodiode 63 for its part is mounted on the head part 101 via a adjustment unit 6. By means of the adjustment unit 6, the photodiode 63 can be set in such a way that it is optimally illuminated by the measurement light beam.

There are several possibilities for positioning the focus of the measurement light beams 500 on the measurement probe 1. On the one hand, the measurement probe holder 2 together with the measurement probe 1 can be moved laterally by means of the displacement unit 4 in two dimensions relative to the lens 53 carrying out the focussing. On the other hand, the laser spot after the lens 53 can likewise be moved in three dimensions above the now stationary measurement probe 1 by moving the lens 58 in the three spatial directions by means of a displacement device 5.

The light cone coming from the condenser illumination 300 is projected into the plane of the specimen 42 at a ratio of 1:1 by means of the central optical tube 103. The optical lenses 53, 54, 55, 64 in the central optical tube 103 are arranged at their relative distances in such a way that mutually facing optical focus points of adjacent lenses 53, 54; 54, 55; 55, 64 in each case impinge at a common point. The focal lengths of the lenses 53, 54, 55, 64 are dimensioned here in such a way that, as an overall system, they form an optical system with a projection scale of 1:1.

The opening ratio of the individual lenses 53, 54, 55, 64 is dimensioned in such a way that the largest possible opening cone for the condenser light can pass through the central optical tube 103, preferably with a numerical aperture greater than approximately 0.20, preferably greater than approximately 0.25 and more preferably greater than approximately 0.30 in the object and image plane. The large opening cone and the numerical aperture greater than 0.25 are design configurations which are preferred independently of the described example of embodiment. The central optical tube 103 will be explained in more detail below with reference to FIGS. 8 to 10.

Another advantage of the described apparatus lies in the fact that the condenser light path 301 and the projection by means of the central optical tube 103 make it possible to observe the specimen 42 to be measured through the central optical tube 103 by means of a reflected light microscope (cf. FIG. 7 below). The central optical tube 103 is in this case used simultaneously as part of the observation and illumination channel, which is available even during the examination of the specimen 42 by means of probe microscopy.

FIG. 4 shows part of the apparatus of FIG. 3, on an enlarged scale.

FIG. 5 shows another apparatus for examining a specimen by means of probe microscopy. Unlike in the embodiment in FIG. 3, the detection of the measurement light beams reflected at the measurement probe 2 is displaced by means of the λ/4 plate 49, the linear polarizer 60, the photodiode 63 and the displacement unit 6 between the lens 57 and the lens 58.

FIG. 6 shows another apparatus for examining a specimen by means of probe microscopy using a transmitted light microscope, wherein an additional illumination beam path (aperture illumination) is formed. A second beam inlet for a second light source 69 is added for additionally illuminating the measurement probe 1. The additional illumination is required for example in the case of an aperture of a nearfield microscope, where a small aperture in the tip of the measurement probe 1 has to be illuminated.

One advantageous configuration may provide that the second light source 69 is coupled in via a monomode optical fibre (not shown).

Light 501 emitted by the second light source 69 for the additional illumination, which optionally emerges in a divergent manner from one end of the optical fibre, is collimated by means of a lens 68 and then focussed by means of a lens 67 which can be moved in all three spatial directions. Here, the focussed laser beam has its smallest constriction at the optical focus point of the lens 67, as a result of which it is likewise displaced when the lens 67 is displaced. In order to be able to move the lens 67 in three spatial directions, said lens is mounted on a displacement device 7 which allows movement in the three spatial directions relative to the head part 101.

The light beam, which is now focussed, is collimated by a lens 66 and coupled via a beam splitter cube 65 into the central optical tube 103. There, after passing through the lenses 55, 54, 53 to the rear side of the measurement probe 1, it is focussed in the measurement probe aperture. The light emerging through the aperture can interact with the specimen 42 and is then collected via the light microscope 400.

FIG. 7 shows a schematic view of an apparatus for examining a specimen 42 by means of probe microscopy, in which there is additionally provided a light microscope in a reflected light configuration, an additional observation beam path being formed. Unlike in the apparatus in FIG. 3, a reflected light microscope 401 is provided for examining the specimen 42 by means of light microscopy. The light coming from the specimen 42 through the central optical tube 103 forms in the object plane 32 of the central optical tube 103 a real intermediate image of the specimen 42. The real intermediate image can then be detected by means of the reflected light microscope 401.

FIGS. 8 to 10 show schematic views of arrangements comprising multiple lenses which serve for implementing the above-described central optical tube 103. The beam splitter cube 56 likewise encompassed by the central optical tube in the previous embodiments has been omitted here in order to simplify the figure.

FIG. 8 shows an arrangement with two optical lenses 80, 81. The two lenses 80, 81 are arranged in such a way that mutually facing optical focus points impinge at a common point. The projection scale of this optical system results from the quotient of the focal lengths of the lenses 80, 81. In order to obtain an optical system with a projection ratio of 1:1, the two lenses 80, 81 must have the same focal length.

The advantage of such an optical system is the independence of the enlargement ratio and of the original image distance from the position of the double lens system between the original plane (at the top in FIG. 8) and the image plane (at the bottom in FIG. 8).

The three diagrams in FIG. 8 show the beam path for three vertical positions. In the middle diagram, the double lens system is located precisely in the centre between the original plane and the image plane. In the two other diagrams, the double lens system is respectively displaced upwards or downwards by a certain amount. It can be seen that the vertical position of the original plane and image plane and also the projection ratio do not change here.

However, the image is inverted, that is to say that a beam pair starting in the top left will be projected at the bottom right. A migration of the original plane would therefore give rise to the directionally opposite effect in the image plane. When using this double lens system, therefore, a lateral displacement of the head part 101 relative to the optical axis of the light microscope (cf. FIG. 3) will cause the condenser projection to migrate from the optical axis.

FIG. 9 shows an optical system with four lenses 90, 91, 92, 93 which are arranged in such a way that mutually facing optical focus points impinge at a common point. The lenses 90, . . . , 93 all have the same focal length so that, here too, a projection ratio of 1:1 is obtained.

Three beam paths are shown. The independence of the projection ratio and of the position of the original plane and image plane from the vertical position of the lens system between these two planes can again be seen. The lens system in FIG. 9 thus behaves in the same way as the double lens system in FIG. 8. However, one difference lies in the fact that the projection is not inverted. A beam pair starting at the top left in this case ends also at the bottom left. When using the lens system from FIG. 9, therefore, a lateral displacement of the head part 101 relative to the optical axis of the light microscope 400 would not cause any migration of the condenser projection from the optical axis.

FIG. 10 shows an optical system again with four lenses 94, 95, 96, 97, but these have different focal lengths. All four lenses 94, . . . , 97 are arranged in such a way that mutually facing optical focus points impinge at a common point. The two inner lenses 95, 96 and the two outer lenses 94, 97 have the same focal length. Here too, the result is again a projection ratio of 1:1. Furthermore, the same properties are obtained as in the optical system in FIG. 9. However, the freedom when selecting the lenses 94, . . . , 97 is greater in this system.

The features of the invention which are disclosed in the above description, the claims and the drawings may be important both individually and in any combination for implementing the invention in its various embodiments.

The invention claimed is:

1. An apparatus for examining a specimen by means of probe microscopy, in particular scanning probe microscopy, comprising
 a probe microscope device having a specimen holder for holding a specimen to be examined, a measurement probe and a displacement unit configured to displace the specimen holder and the measurement probe relative to one another for an examination of the specimen by means of probe microscopy;

a condenser illumination, wherein the probe microscope device further includes an optical system arranged downstream of the condenser illumination, the optical system designed as a multiple lens system with a plurality of optical lenses, wherein the optical system is configured to project a modified condenser light emitted by the condenser illumination in a condenser light path, into a region of the specimen holder for optical microscopy of the specimen to be examined, while at least partially maintaining condenser light parameters with which the condenser light is emitted by the condenser illumination; and a measurement light source emitting measurement light for evaluating a displacement of the measurement probe, wherein the measurement light from said measurement light source is combined with the condenser light from the condenser illumination via a beam splitter in the condenser light path to be focused on the measurement probe, wherein the measurement light source is separated from the optical system of the condenser illumination;

wherein the measurement light source is configured to operate independently of the condenser illumination;

wherein the beam splitter in the condenser light path is arranged upstream of the optical system such that the combined condenser light and measurement light pass through the optical system before reaching the measurement probe.

2. The apparatus according to claim 1, characterized in that the optical system is designed to extend the condenser light path.

3. The apparatus according to claim 1, characterized in that the condenser light path is formed through a holding component which is transparent to light and which holds the measurement probe.

4. The apparatus according to claim 1, characterized in that the condenser light path is formed at least partially through the probe microscope device.

5. The apparatus according to claim 1, characterized in that the optical system is designed to maintain at least one condenser light parameter selected from the following group of condenser light parameters: intensity distribution, polarization distribution, angle of incidence distribution, position of an exit pupil and position of an exit window.

6. The apparatus according to claim 1, characterized in that the plurality of optical lenses have the same focal length.

7. The apparatus according to claim 1, characterized in that the optical system is formed in such a way as to provide a projection scale of 1:1.

8. The apparatus according to claim 1, characterized in that a measurement light beam path for measurement light beams is formed through the optical system.

9. The apparatus according to claim 1, characterized in that the condenser illumination is formed so as to emit the condenser light in the shape of a light cone.

10. The apparatus according to claim 1, characterized by an optical observation channel which is configured for optical microscopy of the specimen.

11. The apparatus according to claim 10, characterized in that the optical system is formed at least partially in the optical observation channel.

12. The apparatus according to claim 10, characterized in that the optical observation channel is configured for examining the specimen by optical microscopy in a transmitted light configuration.

13. The apparatus according to claim 10, characterized in that the optical observation channel is configured for examining the specimen by optical microscopy in a reflected light configuration.

14. The apparatus according to claim 10, characterized by an optical microscope device which is optically coupled to the optical observation channel.

15. The apparatus according to claim 1, characterized in that the probe microscope device is configured to detect measurement-induced movements of the measurement probe during the examination of the specimen by means of probe microscopy using the measurement principle of a light pointer.

16. The apparatus according to claim 1, characterized in that the probe microscope device is designed as a microscope device selected from the following group of microscope devices: scanning probe microscope, nearfield microscope and atomic force microscope.

17. The apparatus according to claim 1, characterized in that a numerical aperture of an opening angle of the optical system towards the specimen holder is greater than approximately 0.20, preferably greater than approximately 0.25 and more preferably greater than approximately 0.30.

18. The apparatus according to claim 1, characterized in that an aperture illumination path for an additional illumination is formed through the optical system.

19. A method for examining a specimen by means of probe microscopy, in particular scanning probe microscopy, comprising:

utilizing a probe microscope device having a specimen holder with a specimen to be examined, a measurement probe and a displacement unit, wherein the specimen holder with the specimen and the measurement probe are displaced relative to one another by means of the displacement unit for examination of the specimen by means of probe microscopy, and wherein condenser light emitted by a condenser illumination in a modified condenser light path, is projected in combination with a measurement light source emitting measurement light for evaluating a displacement of the measurement probe, the measurement additional light source being separated from the condenser illumination, wherein the measurement light from said measurement light source is combined with the condenser light from the condenser illumination via a beam splitter in the condenser light path and said optical system designed as a multiple lens system with a plurality of optical lenses, which is arranged downstream of the condenser illumination, into a region of the specimen holder with the specimen for optical microscopy of the specimen to be examined, while at least partially maintaining condenser light parameters with which the condenser light is emitted by the condenser illumination;

wherein the measurement light source is configured to operate independently of the condenser illumination;

wherein the beam splitter in the condenser light path is arranged upstream of the optical system such that the combined condenser light and measurement light pass through the optical system before reaching the measurement probe.

20. The method according to claim 19, characterized in that the condenser light path is extended by the optical system.

21. The method according to claim 19, characterized in that the condenser light path is guided through a holding component which is transparent to light and which holds the measurement probe.

22. The method according to claim 19, characterized in that the condenser light is guided along the condenser light path at least partially through the probe microscope device.

23. The method according to claim 19, characterized in that at least one condenser light parameter selected from the following group of condenser light parameters is maintained by the optical system: intensity distribution, polarization distribution, angle of incidence distribution, position of an exit pupil and position of an exit window.

24. The method according to claim 19, characterized in that the optical system projects the condenser light on a projection scale of 1:1.

25. The method according to claim 19, characterized in that measurement light beams are guided along a measurement light beam path in the optical system.

26. The method according to claim 19, characterized in that the condenser illumination emits the condenser light in the shape of a light cone.

27. The method according to claim 19, characterized in that the specimen is examined by means of optical microscopy through an optical observation channel.

28. The method according to claim 27, characterized in that the condenser light is at least partially guided in the optical observation channel by means of the optical system.

29. The method according to claim 27, characterized in that the specimen is examined by optical microscopy in a transmitted light configuration.

30. The method according to claim 27, characterized in that the specimen is examined by optical microscopy in a reflected light configuration.

31. The method according to claim 27, characterized in that the optical microscopy is carried out by means of an optical microscope device which is optically coupled to the optical observation channel.

32. The method according to claim 19, characterized in that measurement-induced movements of the measurement probe during the examination of the specimen by means of probe microscopy using the measurement principle of a light pointer are detected by the probe microscope device.

33. The method according to claim 19, characterized in that the examination by means of probe microscopy is carried out using a microscope device selected from the following group of microscope devices: scanning probe microscope, nearfield microscope and atomic force microscope.

34. The method according to claim 19, characterized in that an additional illumination along an aperture illumination path is guided in the optical system.

* * * * *